(12) United States Patent
Wang et al.

(10) Patent No.: US 10,500,936 B2
(45) Date of Patent: Dec. 10, 2019

(54) BATTERY PACK PROTECTIVE FRAME AND BATTERY PACK

(71) Applicant: CONTEMPORARY AMPEREX TECHNOLOGY CO., LIMITED, Ningde (CN)

(72) Inventors: Kangyu Wang, Ningde (CN); Yanhuo Xiang, Ningde (CN); Mu Qian, Ningde (CN); Zongxiang Luo, Ningde (CN); Jiubiao Lin, Ningde (CN); Lei Yang, Ningde (CN)

(73) Assignee: CONTEMPORARY AMPEREX TECHNOLOGY CO., LIMITED, Ningde, Fujian Province (CN)

(*) Notice: Subject to any disclaimer, the term of this patent is extended or adjusted under 35 U.S.C. 154(b) by 51 days.

(21) Appl. No.: 15/914,775

(22) Filed: Mar. 7, 2018

(65) Prior Publication Data
US 2018/0272853 A1    Sep. 27, 2018

(30) Foreign Application Priority Data
Mar. 23, 2017    (CN) .......................... 2017 1 0177340

(51) Int. Cl.
*H01M 2/10* (2006.01)
*B60K 1/04* (2019.01)
(Continued)

(52) U.S. Cl.
CPC .............. *B60K 1/04* (2013.01); *B60L 3/0007* (2013.01); *B60L 3/0046* (2013.01);
(Continued)

(58) Field of Classification Search
None
See application file for complete search history.

(56) References Cited

U.S. PATENT DOCUMENTS

2013/0088044 A1    4/2013    Charbonneau et al.
2015/0021939 A1    1/2015    Bryer et al.
(Continued)

FOREIGN PATENT DOCUMENTS

CN         102729792 A    10/2012
CN         202977558 U    6/2013
(Continued)

OTHER PUBLICATIONS

Contemporary Amperex Technology Co. Ltd., Extended European Search Report, EP18161657.4, dated Aug. 3, 2018, 8 pgs.

*Primary Examiner* — Wyatt P McConnell
(74) *Attorney, Agent, or Firm* — Morgan, Lewis & Bockius LLP

(57) ABSTRACT

The present disclosure provides a battery pack protective frame and a battery pack. The battery pack protective frame comprises a plurality of frame components connected together. Each frame component comprises: a sealing portion extending in an up-down direction for sealing a plurality of battery assemblies to be mounted; a battery fixed portion protruding from a lower portion of the sealing portion toward an inner side in an inner-outer direction for fixing the plurality of battery assemblies to be mounted; and a protective portion protruding from the lower portion of the sealing portion toward an outer side in the inner-outer direction for connecting with a vehicle fixing member. The battery pack comprises a lower box body, a plurality of battery assemblies, a box cover, a gasket, a bottom plate and a protective plate. The lower box body comprises the battery pack protective frame.

14 Claims, 13 Drawing Sheets

(51) Int. Cl.
*B60L 3/00* (2019.01)
*H01M 2/02* (2006.01)

(52) U.S. Cl.
CPC ....... *H01M 2/0247* (2013.01); *H01M 2/1077* (2013.01); *H01M 2/1083* (2013.01); *B60K 2001/0405* (2013.01); *H01M 2220/20* (2013.01)

(56) References Cited

U.S. PATENT DOCUMENTS

| | | |
|---|---|---|
| 2016/0257346 A1 | 9/2016 | Wu et al. |
| 2016/0311301 A1 | 10/2016 | Ikeda et al. |
| 2017/0001507 A1 | 1/2017 | Ashraf et al. |

FOREIGN PATENT DOCUMENTS

| | | |
|---|---|---|
| CN | 103337601 A | 10/2013 |
| CN | 103367670 A | 10/2013 |
| CN | 104617244 A | 5/2015 |
| CN | 205202706 U | 5/2016 |

BATTERY PACK PROTECTIVE FRAME AND BATTERY PACK

REFERENCE TO RELATED APPLICATIONS

The present application claims priority to Chinese patent application No. 201710177340.5, filed on Mar. 23, 2017, which is incorporated herein by reference in its entirety.

FIELD OF THE PRESENT DISCLOSURE

The present disclosure relates to the field of battery pack, and particularly relates to a battery pack protective frame and a battery pack.

BACKGROUND OF THE PRESENT DISCLOSURE

Recently, electric vehicle develops rapidly and the occupancy rate of electric vehicle in the whole vehicle market increases year by year. With the development of passenger electric vehicle, the electric vehicle in long driving mileage with safety and reliability gradually becomes the focus of people's attention. In the technology development of the electric vehicle, each performance of the battery pack of the electric vehicle is the emphasis of technology development.

Battery packs mostly use stamped sheet metal at present, although the stamped sheet metal has some advantages in respects of processing technique, it also has some following disadvantages: firstly, a thickness of the sheet metal used to make the battery pack is thin, which leads the whole battery pack to be not sufficient in modality, rigidity and strength and in turn the whole battery pack cannot meets high requirement on mechanical strength; secondly, the weight of the battery pack which uses the stamped sheet metal is high and the energy density of the battery pack is small; thirdly, the battery packs mostly lacks anti-collision device and anti-crushing device, so when the vehicle collides or is crushed, the batteries inside the battery pack will be crushed easily, thereby resulting in accident such as firing or exploding; fourthly, at present the mounting structure and the protecting structure between the battery pack and the vehicle are independent relative to each other, so the integration of components needs to be improved.

SUMMARY OF THE PRESENT DISCLOSURE

In view of the problem existing in the background, an object of the present disclosure is to provide a battery pack protective frame and a battery pack, which can improve safety performance and protection capability of the battery pack.

In order to achieve the above object, in a first aspect, the present disclosure provides a battery pack protective frame, which comprises a plurality of frame components securely connected together. Each frame component comprises: a sealing portion extending in an up-down direction for sealing a plurality of battery assemblies to be mounted; a battery fixed portion protruding from a lower portion of the sealing portion toward an inner side in an inner-outer direction for fixing the plurality of battery assemblies to be mounted; and a protective portion protruding from the lower portion of the sealing portion toward an outer side in the inner-outer direction for connecting with a vehicle fixing member.

In order to achieve the above object, in a second aspect, the present disclosure provides a battery pack, which comprises a lower box body, a plurality of battery assemblies, a box cover, a gasket, a bottom plate and a protective plate. The lower box body comprises the battery pack protective frame according to the first aspect of the present disclosure. The plurality of battery assemblies are received in the battery pack protective frame and each battery assembly is securely connected to the corresponding battery fixed portion of the frame component. The box cover is provided above the battery pack protective frame and securely connected to the sealing portions of the plurality of frame components. The gasket is interposed between the box cover and the sealing portions of the plurality of frame components. The bottom plate is provided under the battery pack protective frame and securely connected to the battery fixed portions of the plurality of frame components. The protective plate is provided under the bottom plate and securely connected to the protective portions of the plurality of frame components.

The present disclosure has the following beneficial effects: in the battery pack protective frame and the battery pack, because the battery pack protective frame is connected with the vehicle fixing member directly, when the vehicle collides or is crushed, the protective portions of the battery pack protective frame can absorb the energy generated in the colliding process or crushing process by generating deformation, thereby effectively protecting the battery assemblies fixed to the battery fixed portion, preventing the battery assemblies from colliding or being crushed under the energy impact, avoiding the battery assemblies firing or exploding. In addition, the protective portion is both a protecting structure and a connecting structure between the battery pack protective frame and the vehicle fixing member, therefore, compare to the independent protecting structure and the independent connecting structure of prior art, the protecting structure and the connecting structure of the battery pack of present disclosure are directly designed as an integral battery pack protective frame, which has high integration and improves whole structure performance of the vehicle.

Figure 1:
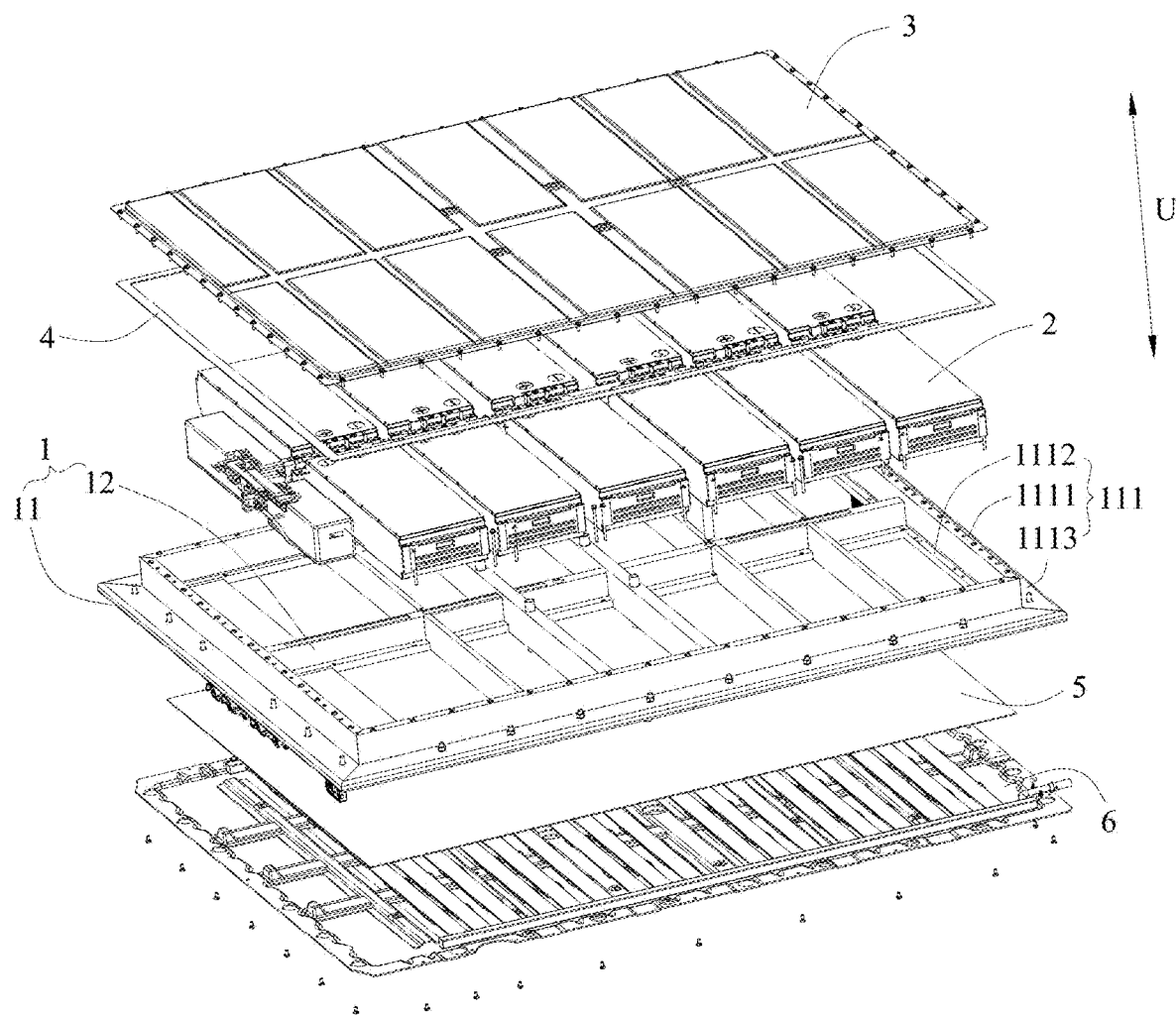
FIG. 1 is an exploded view of a battery pack according to the present disclosure.
Figure 2:
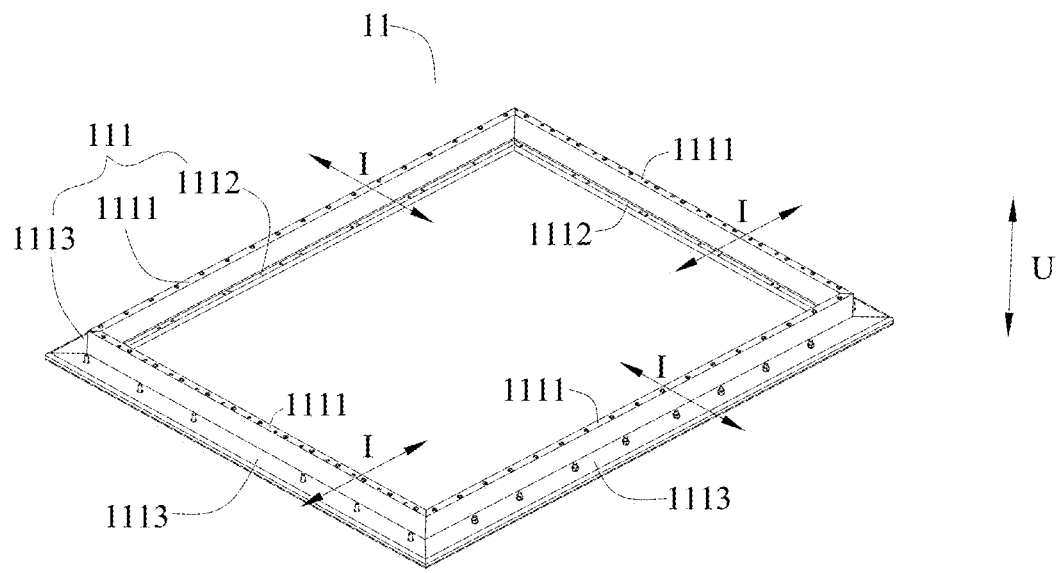
FIG. 2 is a schematic view of a battery pack protective frame according to the present disclosure.

REFERENCE NUMERALS IN FIGURES ARE REPRESENTED AS FOLLOWS 1 lower box body
11 battery pack protective frame
111 frame component
1111 sealing portion
11111 sealing portion outer wall
11112 sealing portion ribbed plate
1112 battery fixed portion
11121 battery fixed portion outer wall
11122 battery fixed portion ribbed plate
1113 protective portion
11131 protective portion outer wall
11132 protective portion ribbed plate
1114 connecting wall
1115 inter-portion ribbed plate
12 reinforcing beam
2 battery assembly
3 box cover
4 gasket
5 bottom plate
6 protective plate
S1 protective portion cavity
S2 sealing portion cavity
S3 battery fixed portion cavity
R avoiding recess
F vehicle fixing member
U up-down direction
I inner-outer direction

DETAILED DESCRIPTION

Hereinafter a battery pack protective frame and a battery pack according to the present disclosure will be described in detail in combination with the figures.

Firstly, a battery pack protective frame according to a first aspect of the present disclosure will be described.

Referring to FIG. 1 to FIG. 14B, a battery pack protective frame 11 according to the present disclosure comprises a plurality of frame components 111 securely connected together. Each frame component 111 comprises: a sealing portion 1111 extending in an up-down direction U for sealing a plurality of battery assemblies 2 to be mounted; a battery fixed portion 1112 protruding from a lower portion of the sealing portion 1111 toward an inner side in an inner-outer direction I for fixing the plurality of battery assemblies 2 to be mounted; and a protective portion 1113 protruding from the lower portion of the sealing portion 1111 toward an outer side in the inner-outer direction I for connecting with a vehicle fixing member F.

In the battery pack protective frame 11 according to the present disclosure, because the protective portion 1113 is provided on an outer periphery of the corresponding frame component 111 and is the part bearing the external force firstly when the vehicle collides or is crushed, the protective portion 1113 may absorb the energy generated in the colliding process or crushing process by generating deformation, thereby effectively protecting the battery assemblies 2 fixed to the battery fixed portion 1112, preventing the battery assemblies 2 from colliding or being crushed under the energy impact, avoiding the battery assemblies 2 firing or exploding. In addition, the protective portion 1113 is both a protecting structure and a connecting structure between the battery pack protective frame 11 and the vehicle fixing member F, therefore, the battery pack protective frame 11 according to the present disclosure has high integration and good whole structure property, plays protection function and solves design difficulty problem in the mounting structure between the battery pack protective frame 11 and the vehicle (such as an electric vehicle, the vehicle fixing member F is one component of the vehicle).

In the battery pack protective frame 11 according to the present disclosure, a width of the protective portion 1113 in the inner-outer direction I should be as large as possible on the premise that space is enough, so that the protective portion 1113 can absorb more energy and improve an anti-crushing ability and an anti-collision ability of the battery pack protective frame 11.

In the battery pack protective frame 11 according to the present disclosure, the sealing portion 1111, the battery fixed portion 1112 and the protective portion 1113 of each frame component 111 are integrally formed. Preferably, each frame component 111 is formed by extrusion forming. The plurality of frame components 111 may be securely connected together by welding, thereby forming the battery pack protective frame 11; the plurality of frame components 111 also can be integrally formed to form the battery pack protective frame 11.

In the battery pack protective frame 11 according to the present disclosure, the battery fixed portion 1112 is provided with holes fitted with corresponding bolts respectively, so the battery assemblies 2 can be fixed to the battery fixed portion 1112 by the bolts. The protective portion 1113 is provided with holes fitted with corresponding bolts respectively, so the protective portion 1113 and the vehicle fixing member F are securely connected by the bolts.

In the battery pack protective frame 11 according to the present disclosure, each frame component 111 is made of aluminum alloy. The aluminum alloy can reduce a weight of the battery pack protective frame 11, thereby improving energy density of a battery pack which uses the battery pack protective frame 11 of the present disclosure.

In the battery pack protective frame 11 according to the present disclosure, referring to FIG. 4 to FIG. 14B, the protective portion 1113 has: a protective portion outer wall 11131 forming an external profile of the protective portion 1113 and a protective portion cavity S1 inside the protective portion outer wall 11131; and a plurality of protective portion ribbed plates 11132 positioned inside the protective portion cavity S1, supporting the protective portion outer wall 11131 and dividing the protective portion cavity S1 into a plurality of sub-cavities. The protective portion 1113 with such a structure can further reduce the weight of the frame component 111 and the plurality of protective portion ribbed plates 11132 also can ensure the whole strength of the protective portion 1113 at the same time; in addition, when the vehicle collides or is crushed, the stress to which the protective portion 1113 is subjected will be transmitted along the plurality of protective portion ribbed plates 11132, and in the transmitting process, each protective portion ribbed plate 11132 can absorb energy effectively (each protective portion ribbed plate 11132 will be easily deformed under the stress, so each protective portion ribbed plate 11132 can play function of buffering and absorbing energy), thereby preventing the battery assemblies 2 from colliding or being crushed under the energy impact.

In the battery pack protective frame 11 according to the present disclosure, referring to FIG. 4, FIG. 5A, FIG. 6A, FIG. 7A, FIG. 8A, FIG. 9A, FIG. 10A, FIG. 11A, FIG. 12A, FIG. 13A and FIG. 14A, each protective portion ribbed plate 11132 is a vertical ribbed plate which is parallel to the up-down direction U, a horizontal ribbed plate which is parallel to the inner-outer direction I, or an oblique ribbed plate which is neither parallel to the up-down direction U nor parallel to the inner-outer direction I.

In the battery pack protective frame 11 according to the present disclosure, referring to FIG. 4, FIG. 5A, FIG. 6A, FIG. 7A, FIG. 8A, FIG. 9A, FIG. 10A, FIG. 11A, FIG. 12A and FIG. 13A, two ends of each protective portion ribbed plate 11132 are connected to the protective portion outer wall 11131.

Figure 8A:
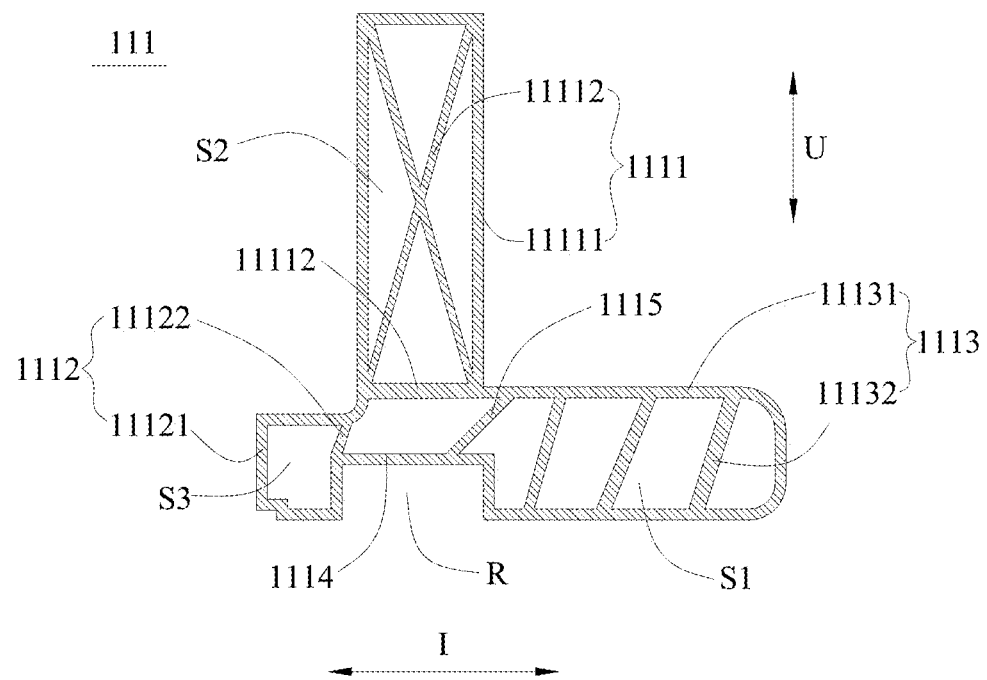
FIG. 8A is a schematic view of a fourth embodiment of the battery pack protective frame according to the present disclosure.
Figure 8B:
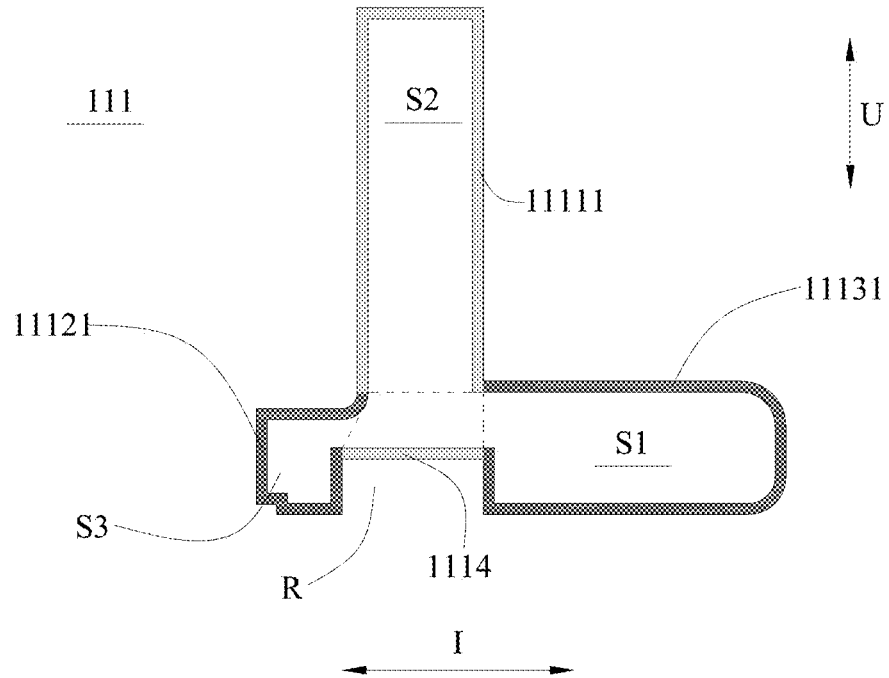
FIG. 8B is a schematic view of FIG. 8A with all ribbed plates removed.
Figure 10A:
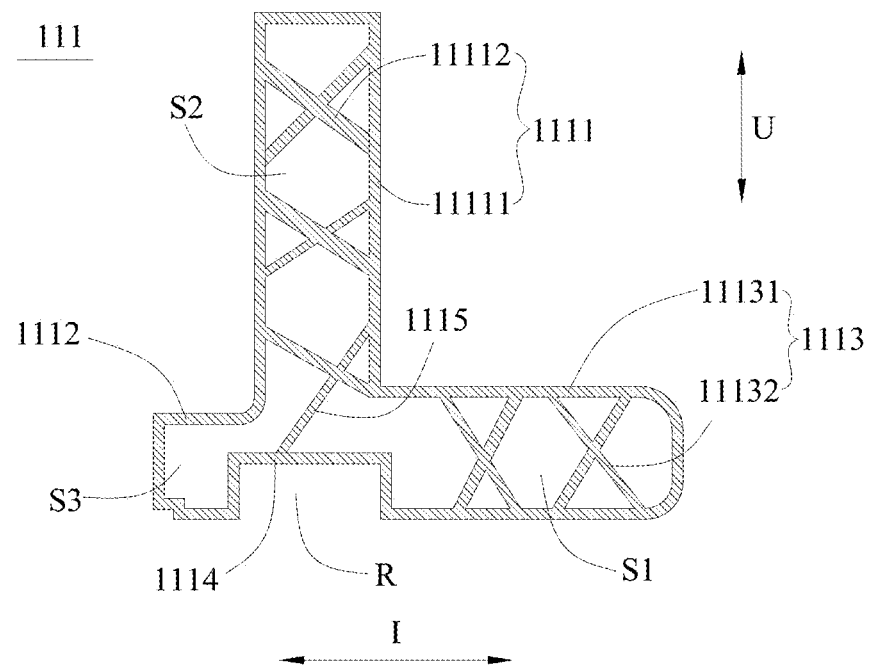
FIG. 10A is a schematic view of a sixth embodiment of the battery pack protective frame according to the present disclosure.
Figure 10B:
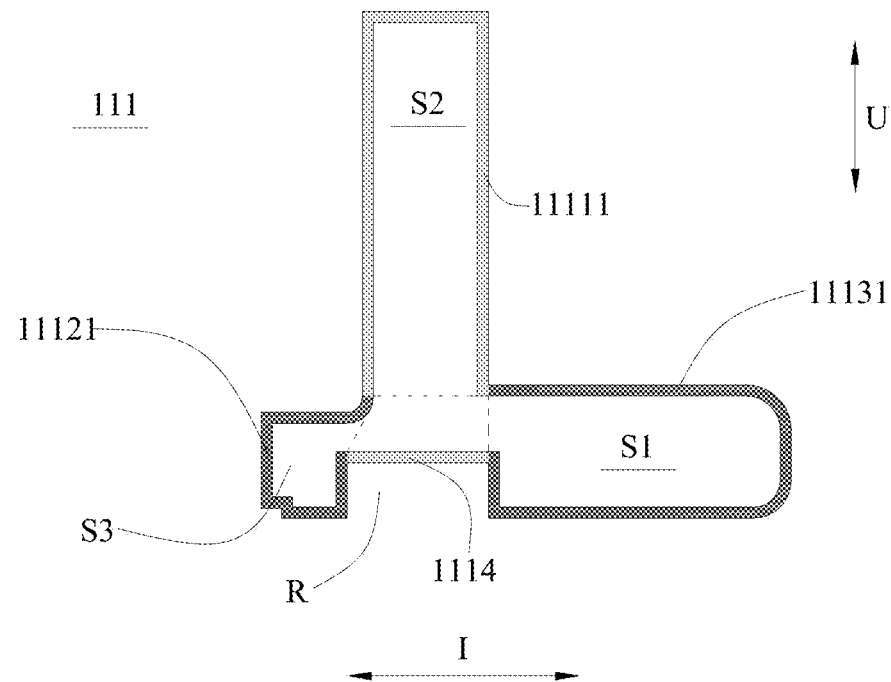
FIG. 10B is a schematic view of FIG. 10A with all ribbed plates removed.

In the battery pack protective frame 11 according to the present disclosure, referring to FIG. 8A and FIG. 10A, the two ends of each protective portion ribbed plate 11132 are respectively connected to two opposite parts of the protective portion outer wall 11131 in the up-down direction U. In an embodiment, referring to FIG. 10A, in the plurality of protective portion ribbed plates 11132, there are at least one pair of protective portion ribbed plates 11132 to cross each other.

Figure 5A:
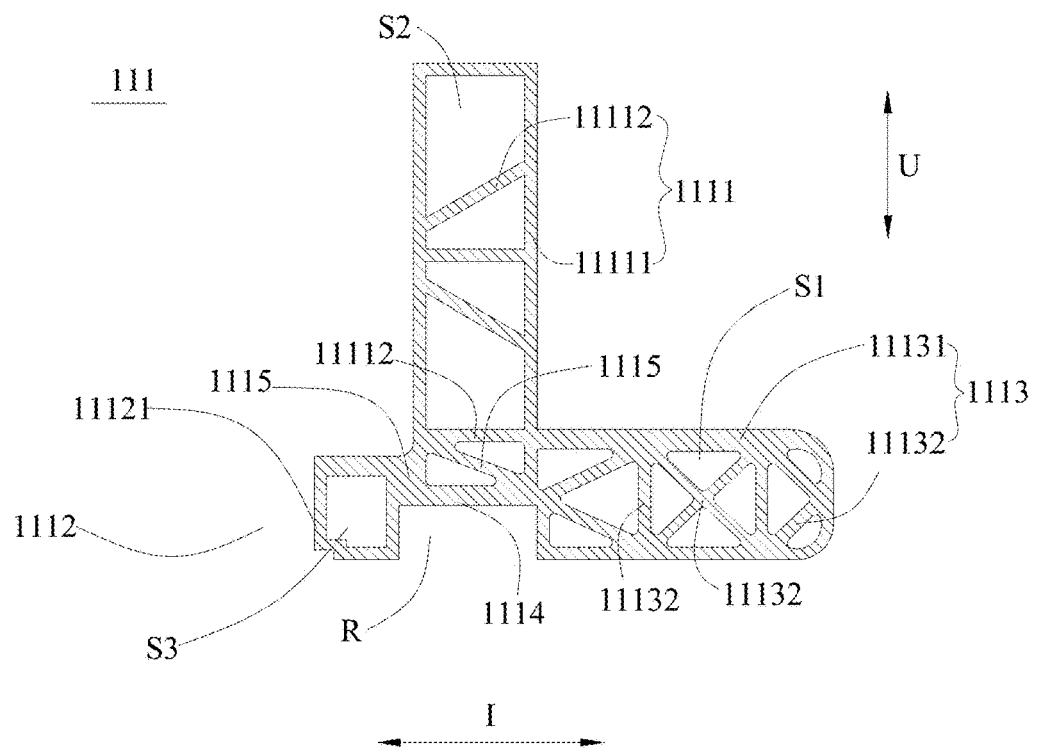
FIG. 5A is a schematic view of a first embodiment of the battery pack protective frame according to the present disclosure.
Figure 5B:
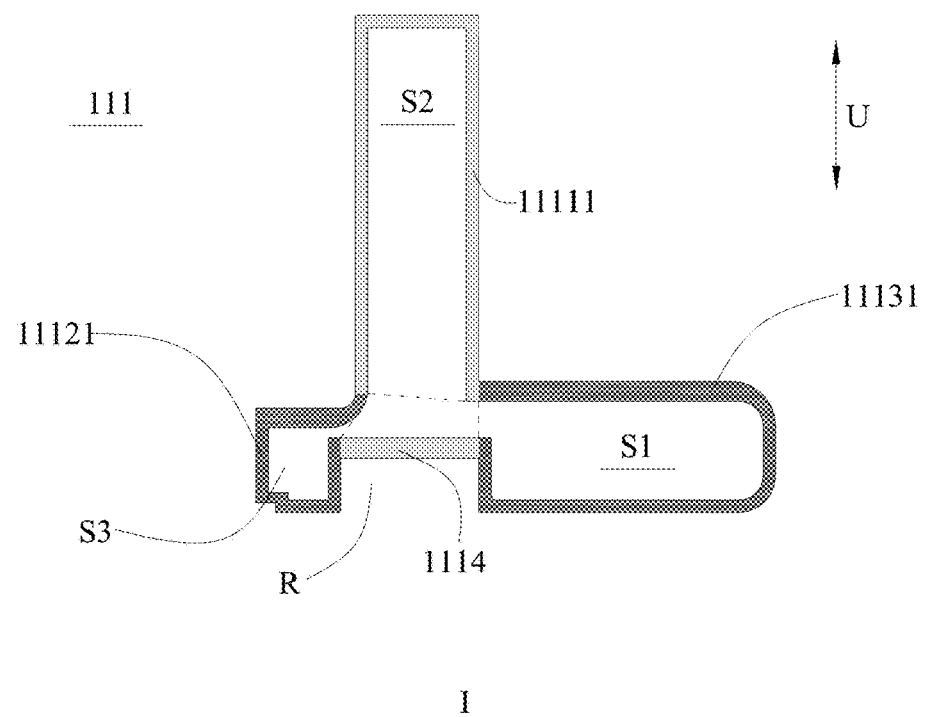
FIG. 5B is a schematic view of FIG. 5A with all ribbed plates removed.
Figure 13A:
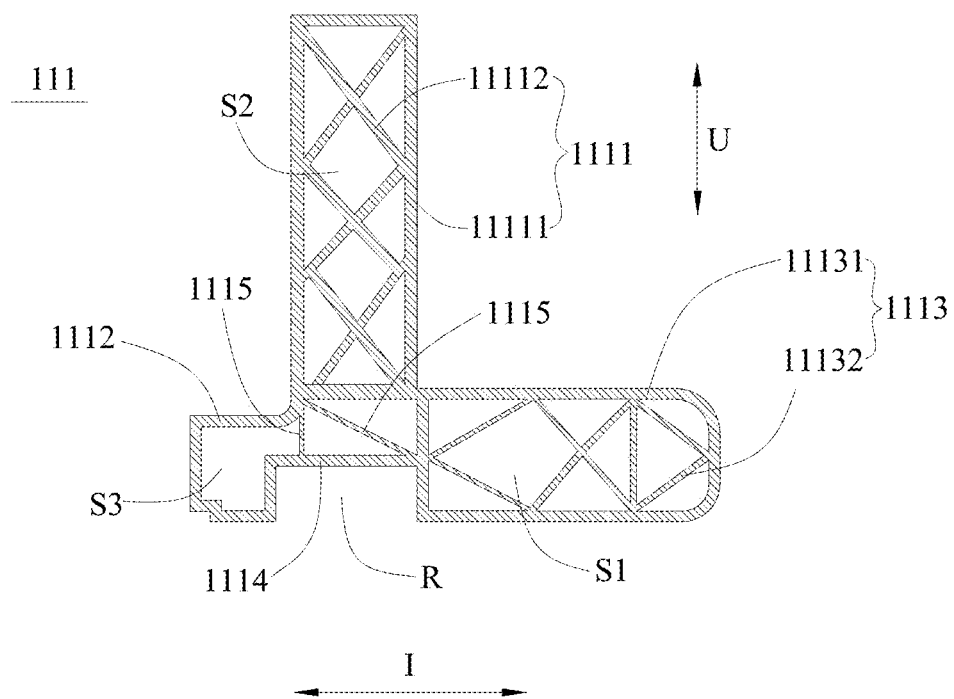
FIG. 13A is a schematic view of a ninth embodiment of the battery pack protective frame according to the present disclosure.
Figure 13B:
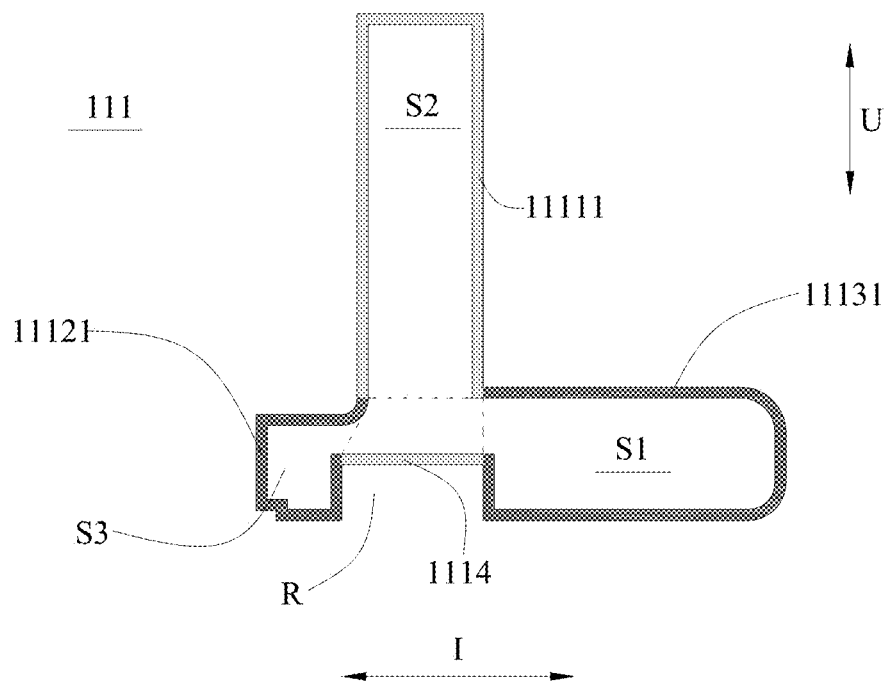
FIG. 13B is a schematic view of FIG. 13A with all ribbed plates removed.

In the battery pack protective frame 11 according to the present disclosure, referring to FIG. 5A and FIG. 13A, in the plurality of protective portion ribbed plates 11132, there are two protective portion ribbed plates 11132 which are provided at an outer end of the protective portion cavity S1 in the inner-outer direction I; in the two protective portion ribbed plates 11132, an end of one protective portion ribbed plate 11132 and an end of the other one protective portion ribbed plate 11132 are connected together and are connected to an outer part of the protective portion outer wall 11131 in the inner-outer direction I, and the other end of the one protective portion ribbed plate 11132 and the other end of the other one protective portion ribbed plate 11132 are respectively connected to two opposite parts of the protective portion outer wall 11131 in the up-down direction U. In an embodiment, referring to FIG. 5A and FIG. 13A, the two protective portion ribbed plates 11132 are symmetric about the inner-outer direction I (the stress can be uniformly transmitted along the two symmetric protective portion ribbed plates 11132). In another embodiment, referring to FIG. 5A and FIG. 13A, in the plurality of protective portion ribbed plates 11132, there is another protective portion ribbed plate 11132 which is further provided in the protective portion cavity S1 of the protective portion 1113 and connects the other end of the one protective portion ribbed plate 11132 and the other end of the other one protective portion ribbed plate 11132. The another protective portion ribbed plate 11132 and the aforementioned two protective portion ribbed plates 11132 form a triangle, thereby improving the strength of the outer end of the protective portion 1113 in the inner-outer direction I.

In the battery pack protective frame 11 according to the present disclosure, referring to FIG. 5A and FIG. 13A, in the plurality of protective portion ribbed plates 11132, there are two protective portion ribbed plates 11132 which are provided at an inner end of the protective portion cavity S1 in the inner-outer direction I; in the two protective portion ribbed plates 11132, an end of one protective portion ribbed plate 11132 and an end of the other one protective portion ribbed plate 11132 are connected together and are connected to an inner part of the protective portion outer wall 11131 in the inner-outer direction I, and the other end of the one protective portion ribbed plate 11132 and the other end of the other one protective portion ribbed plate 11132 are respectively connected to two opposite parts of the protective portion outer wall 11131 in the up-down direction U. In an embodiment, referring to FIG. 5A and FIG. 13A, the two protective portion ribbed plates 11132 are symmetric about the inner-outer direction I (the stress can be uniformly transmitted along the two symmetric protective portion ribbed plates 11132). In another embodiment, referring to FIG. 5A, in the plurality of protective portion ribbed plates 11132, there is another protective portion ribbed plate 11132 which is further provided in the protective portion cavity S1 of the protective portion 1113 and connects the other end of the one protective portion ribbed plate 11132 and the other end of the other one protective portion ribbed plate 11132. The another protective portion ribbed plate 11132 and the aforementioned two protective portion ribbed plates 11132 form a triangle, thereby improving the strength of the inner end of the protective portion 1113 in the inner-outer direction I.

Figure 6A:
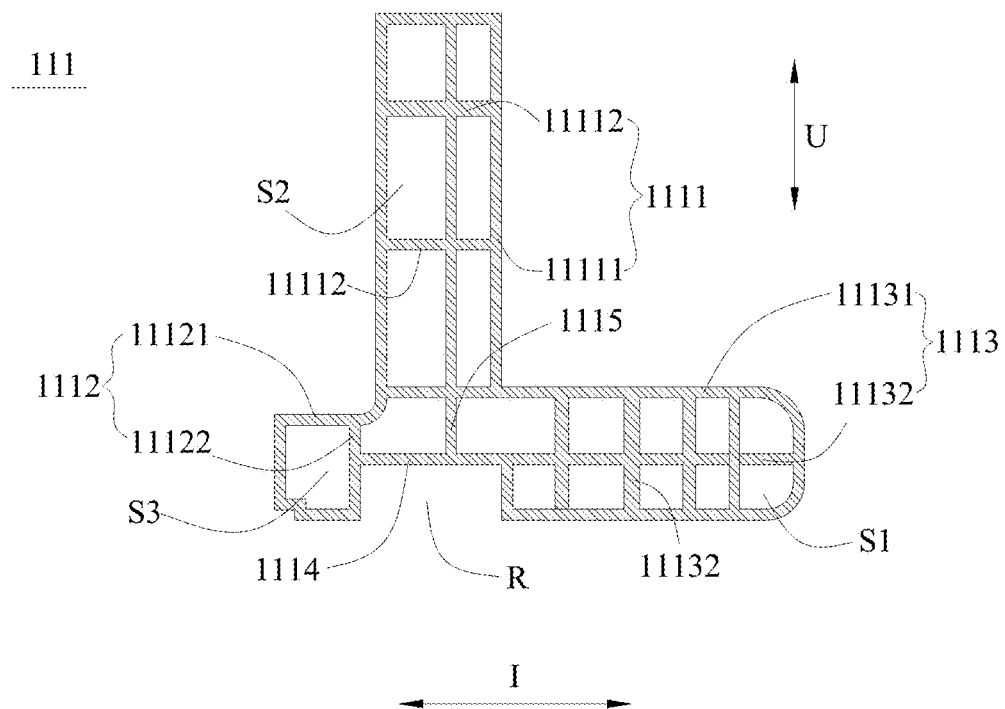
FIG. 6A is a schematic view of a second embodiment of the battery pack protective frame according to the present disclosure.
Figure 6B:
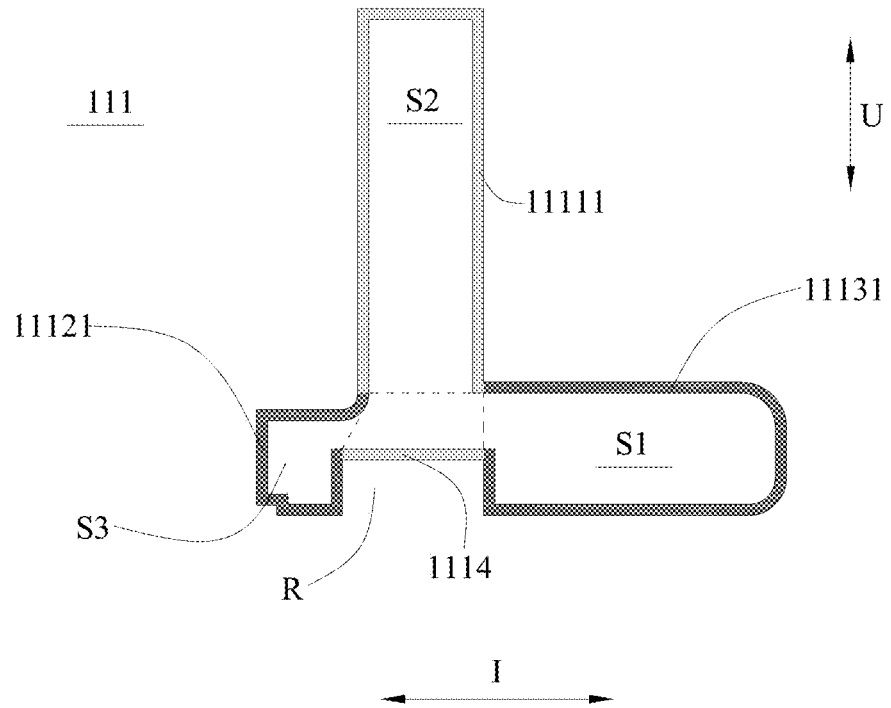
FIG. 6B is a schematic view of FIG. 6A with all ribbed plates removed.
Figure 7A:
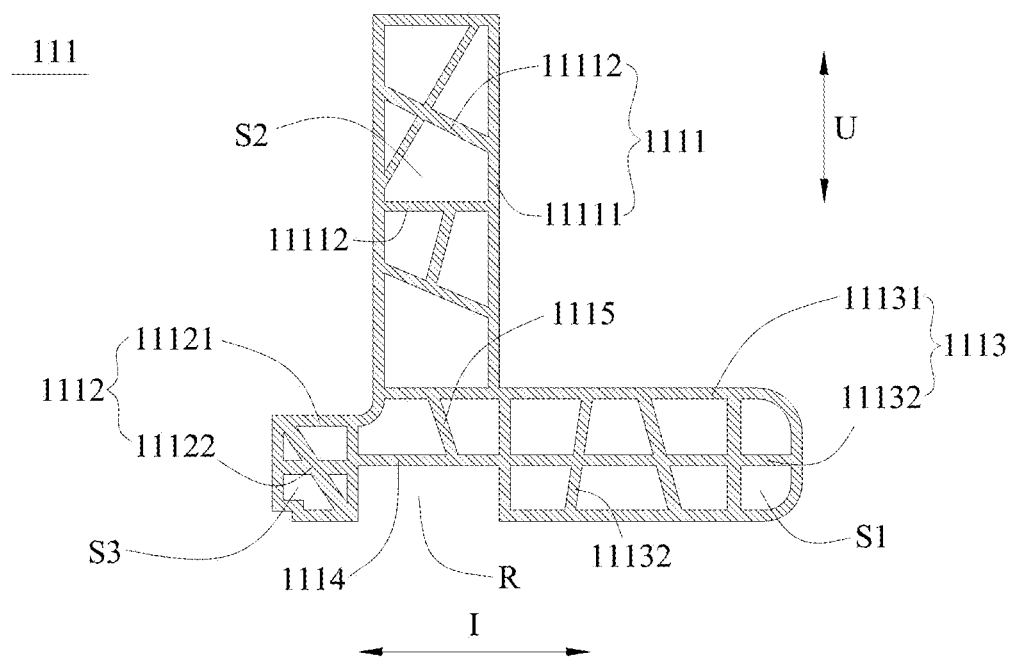
FIG. 7A is a schematic view of a third embodiment of the battery pack protective frame according to the present disclosure.
Figure 7B:
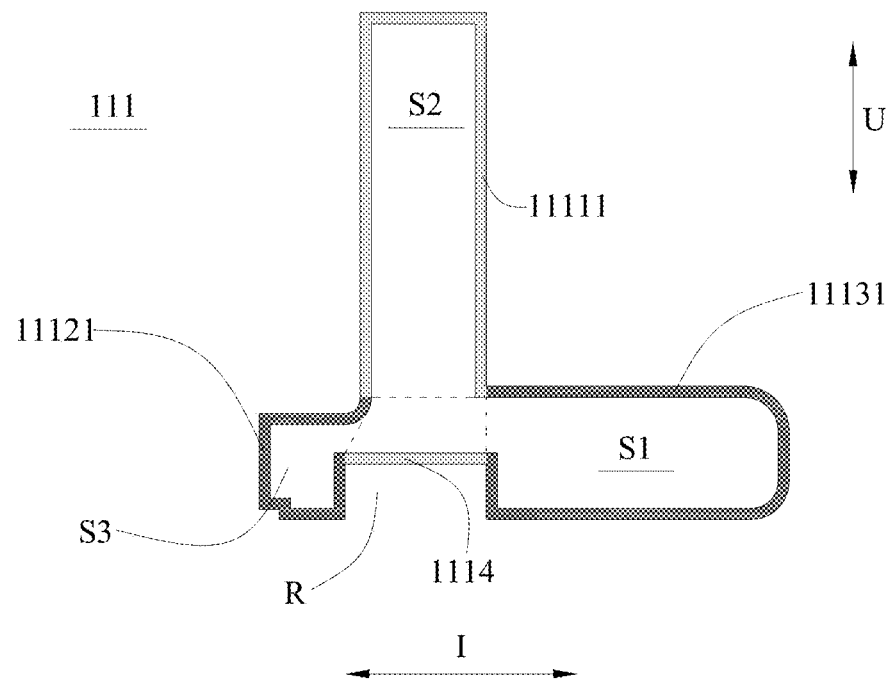
FIG. 7B is a schematic view of FIG. 7A with all ribbed plates removed.

In the battery pack protective frame 11 according to the present disclosure, referring to FIG. 6A and FIG. 7A, at least one protective portion ribbed plate 11132 connects two opposite parts of the protective portion outer wall 11131 in the up-down direction U; at least one protective portion ribbed plate 11132 connects two opposite parts of the protective portion outer wall 11131 in the inner-outer direction I; the protective portion ribbed plate 11132 which connects the two opposite parts of the protective portion outer wall 11131 in the up-down direction U and the protective portion ribbed plate 11132 which connects the two opposite parts of the protective portion outer wall 11131 in the inner-outer direction I cross each other.

In the battery pack protective frame 11 according to the present disclosure, referring to FIG. 5A, FIG. 6A, FIG. 7A, FIG. 10A, FIG. 11A, FIG. 12A, FIG. 13A and FIG. 14A, in the plurality of protective portion ribbed plates 11132, there are at least one pair of protective portion ribbed plates 11132 to cross each other.

In the battery pack protective frame 11 according to the present disclosure, referring to FIG. 4 to FIG. 14B, the sealing portion 1111 has: a sealing portion outer wall 11111 forming an external profile of the sealing portion 1111 and a sealing portion cavity S2 inside the sealing portion outer wall 11111; and a plurality of sealing portion ribbed plates 11112 positioned inside the sealing portion cavity S2, supporting the sealing portion outer wall 11111 and dividing the sealing portion cavity S2 into a plurality of sub-cavities. The sealing portion 1111 with such a structure can further reduce the weight of the frame component 111 and the plurality of sealing portion ribbed plate 11112 also can ensure the whole strength of the sealing portion 1111 at the same time; in addition, when the vehicle collides or is crushed, the sealing portion 1111 will bear bending moment firstly, and each sealing portion ribbed plate 11112 can reduce the influence of the bending moment and absorb energy, thereby further improving the strength of the battery pack protective frame 11 and the protecting ability of the battery pack protective frame 11.

In the battery pack protective frame 11 according to the present disclosure, referring to FIG. 4, FIG. 5A, FIG. 6A, FIG. 7A, FIG. 8A, FIG. 9A, FIG. 10A, FIG. 11A, FIG. 12A, FIG. 13A and FIG. 14A, each sealing portion ribbed plate 11112 is a vertical ribbed plate which is parallel to the up-down direction U, a horizontal ribbed plate which is parallel to the inner-outer direction I, or an oblique ribbed plate which is neither parallel to the up-down direction U nor parallel to the inner-outer direction I.

In the battery pack protective frame 11 according to the present disclosure, referring to FIG. 5A, FIG. 6A, FIG. 8A, FIG. 9A, FIG. 10A, FIG. 11A, FIG. 12A, FIG. 13A and FIG. 14A, two ends of each sealing portion ribbed plate 11112 are connected to the sealing portion outer wall 11111. In an embodiment, referring to FIG. 5A, FIG. 6A, FIG. 8A, FIG. 9A, FIG. 10A, FIG. 11A, FIG. 12A, FIG. 13A and FIG. 14A, the two ends of each sealing portion ribbed plate 11112 are respectively connected to two opposite parts of the sealing portion outer wall 11111 in the up-down direction U. In another embodiment, referring to FIG. 7A, FIG. 8A, FIG. 10A and FIG. 13A, in the plurality of sealing portion ribbed plates 11112, there are at least one pair of sealing portion ribbed plates 11112 to cross each other.

Figure 11A:
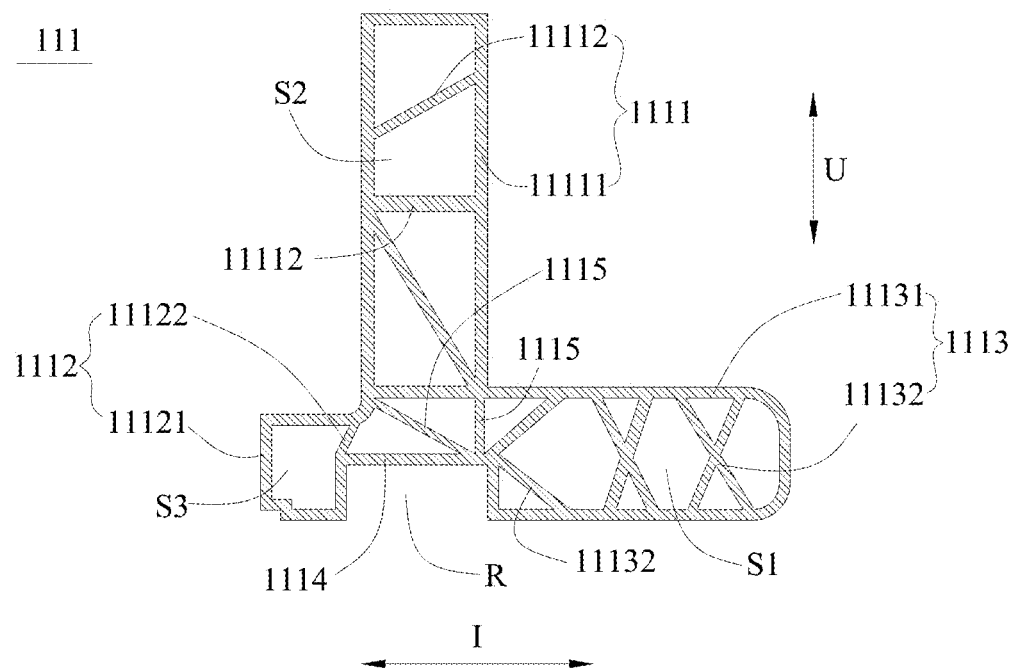
FIG. 11A is a schematic view of a seventh embodiment of the battery pack protective frame according to the present disclosure.
Figure 11B:
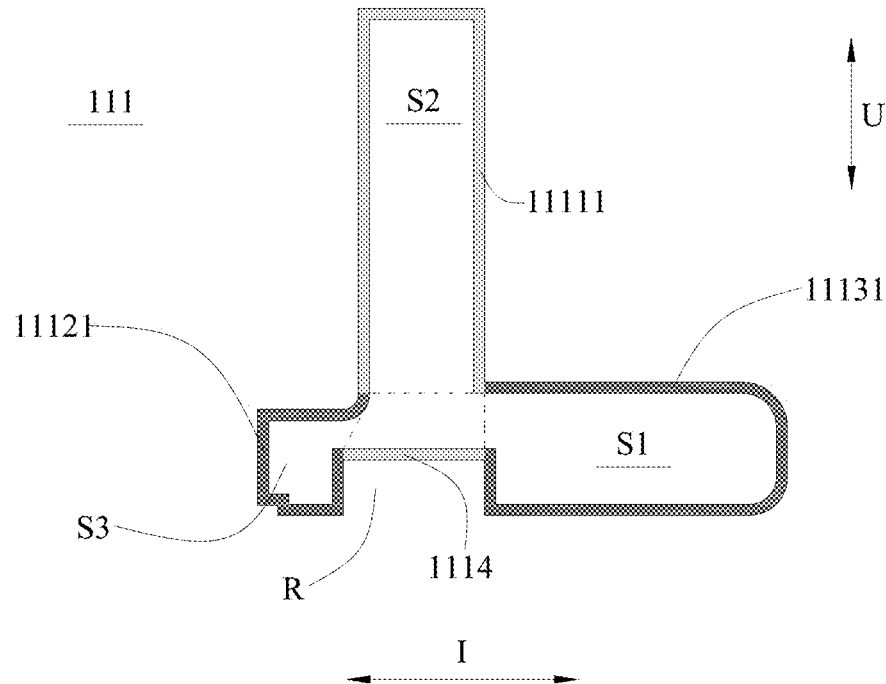
FIG. 11B is a schematic view of FIG. 11A with all ribbed plates removed.

In the battery pack protective frame 11 according to the present disclosure, referring to FIG. 5A and FIG. 11A, in the plurality of sealing portion ribbed plates 11112, there is three sealing portion ribbed plates 11112, one of the three sealing portion ribbed plates 11112 is parallel to the inner-outer direction I and the other two of the three sealing portion ribbed plates 11112 are neither parallel to the up-down direction U nor parallel to the inner-outer direction I, and the one of the three sealing portion ribbed plates 11112 is positioned between the other two of the three sealing portion ribbed plates 11112. In an embodiment, referring to FIG. 5A, the other two of the three sealing portion ribbed plates 11112 are symmetric about the one of the three sealing portion ribbed plates 11112. Further, referring to FIG. 5A, the three sealing portion ribbed plates 11112 are positioned in a middle of the sealing portion cavity S2. Because the sealing portion 1111 will bear the bending moment firstly, the three sealing portion ribbed plates 11112 with such an arrangement can improve the bending moment resisting ability of the sealing portion 1111.

Figure 9A:
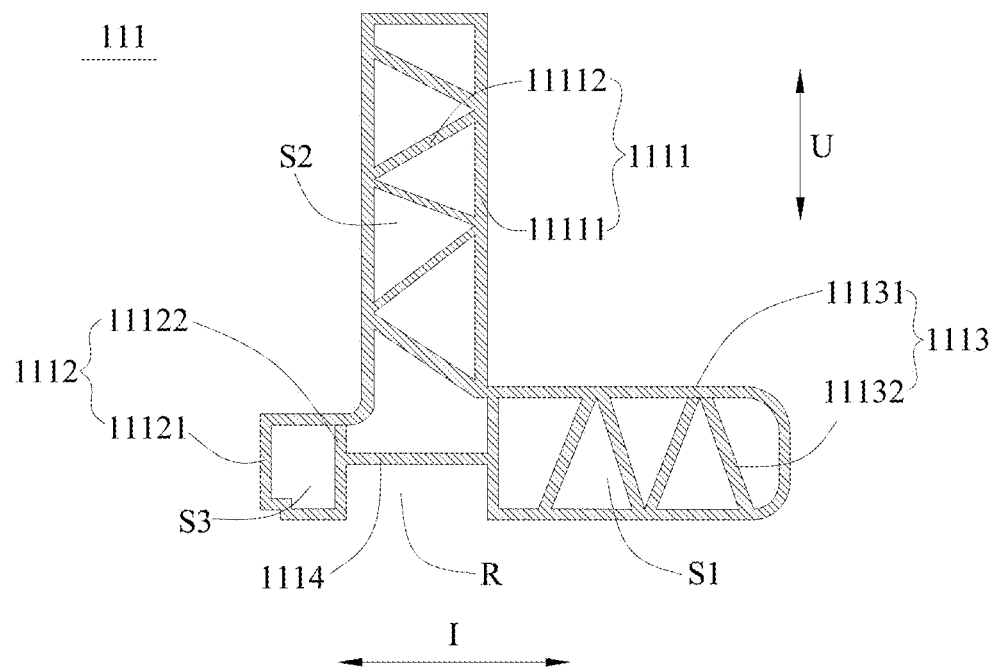
FIG. 9A is a schematic view of a fifth embodiment of the battery pack protective frame according to the present disclosure.
Figure 9B:
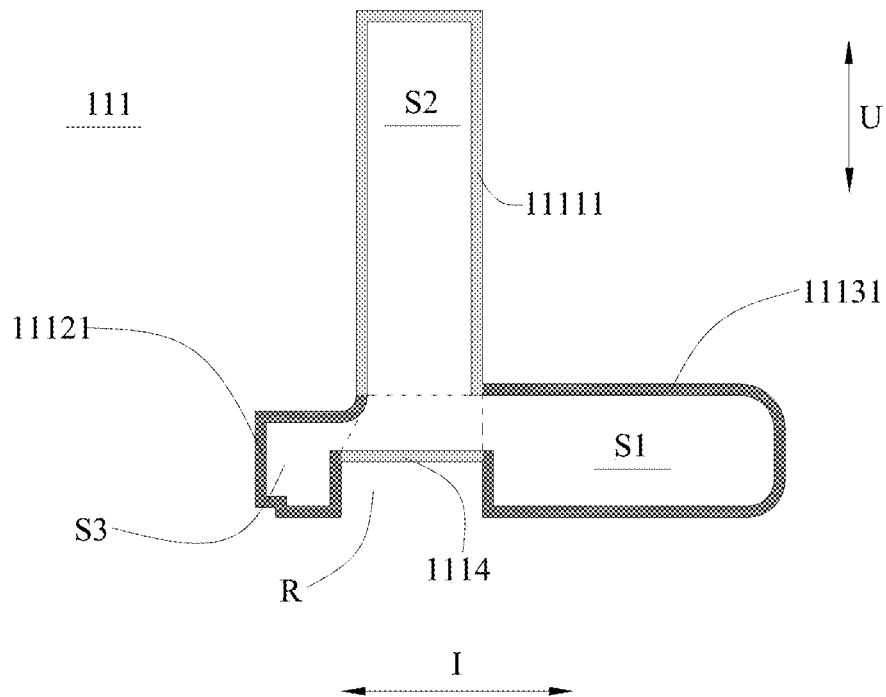
FIG. 9B is a schematic view of FIG. 9A with all ribbed plates removed.
Figure 12A:
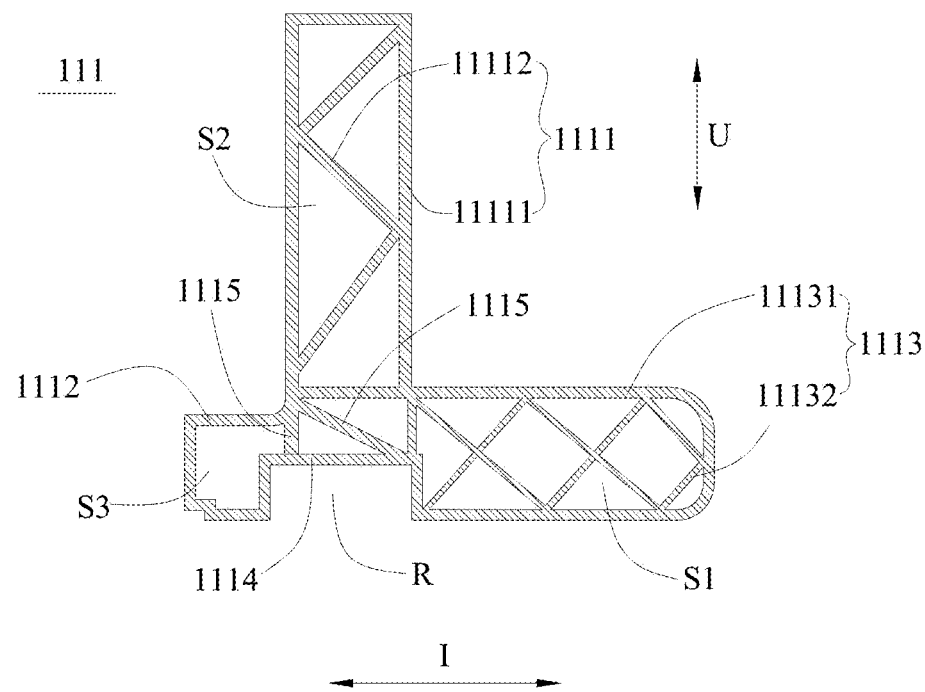
FIG. 12A is a schematic view of an eighth embodiment of the battery pack protective frame according to the present disclosure.
Figure 12B:
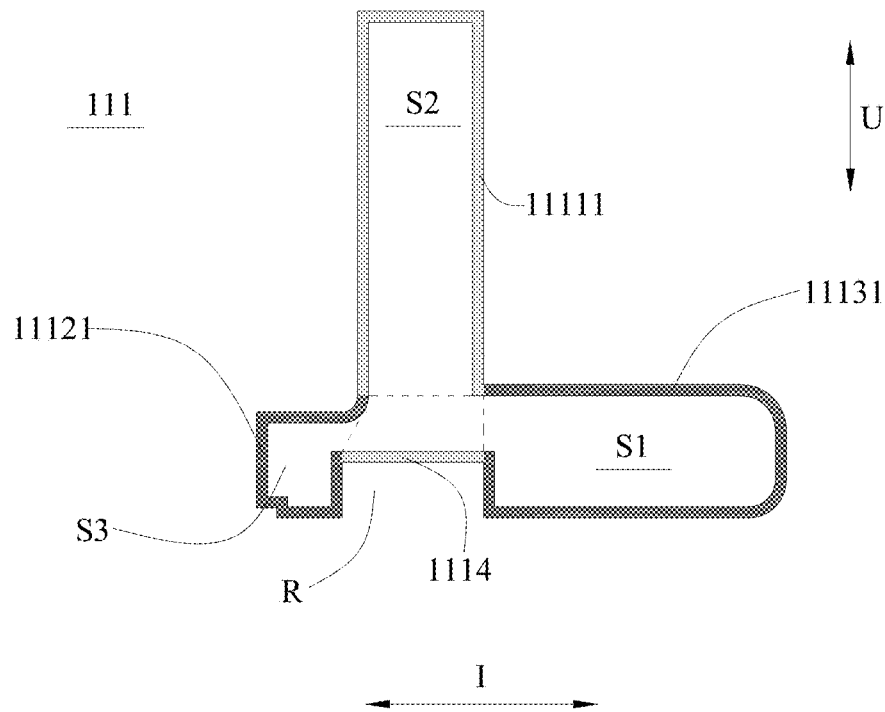
FIG. 12B is a schematic view of FIG. 12A with all ribbed plates removed.

In the battery pack protective frame 11 according to the present disclosure, referring to FIG. 9A and FIG. 12A, every two adjacent sealing portion ribbed plates 11112 are connected end to end and form a reciprocally folding shape in the up-down direction U.

Figure 14A:
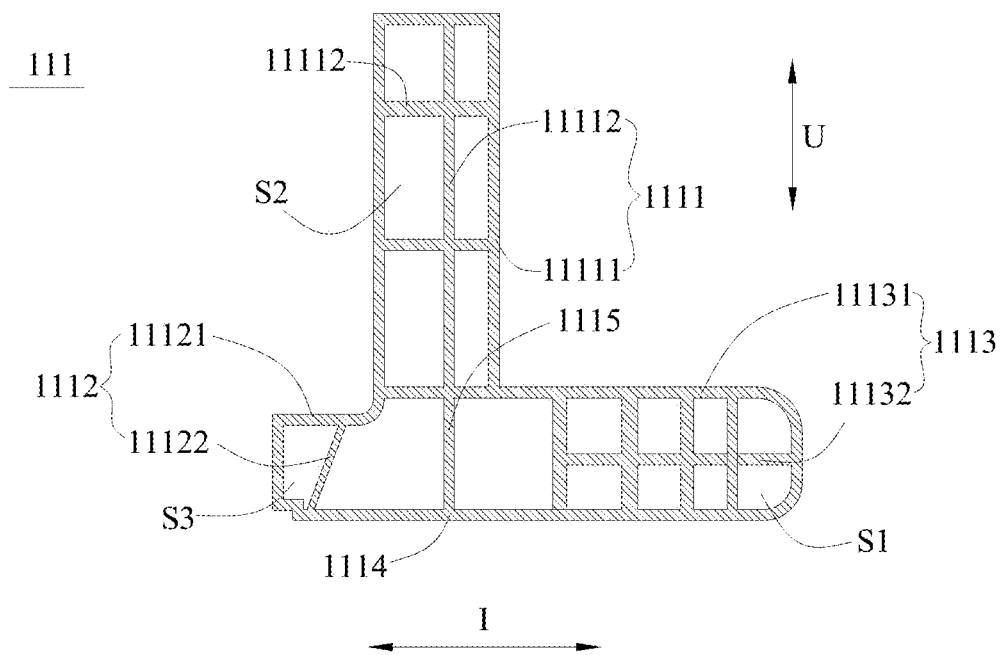
FIG. 14A is a schematic view of a tenth embodiment of the battery pack protective frame according to the present disclosure.
Figure 14B:
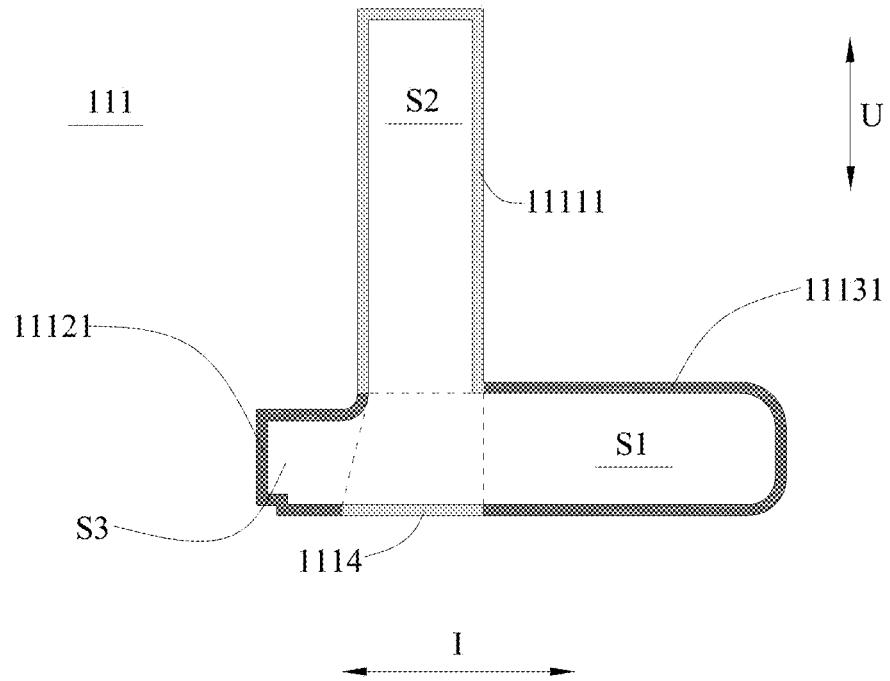
FIG. 14B is a schematic view of FIG. 14A with all ribbed plates removed.

In the battery pack protective frame 11 according to the present disclosure, referring to FIG. 6A and FIG. 14A, each sealing portion ribbed plate 11112 is a horizontal ribbed plate which is parallel to the inner-outer direction I.

In the battery pack protective frame 11 according to the present disclosure, referring to FIG. 7A, in the plurality of sealing portion ribbed plates 11112, there is one sealing portion ribbed plate 11112, one end of which is connected to a part of the sealing portion outer wall 11111 in the inner-outer direction I and the other end of which is connected to a part of the sealing portion outer wall 11111 in the up-down direction U.

In the battery pack protective frame 11 according to the present disclosure, referring to FIG. 7A, in the plurality of sealing portion ribbed plates 11112, there are three sealing portion ribbed plates 11112, both ends of one of the three sealing portion ribbed plate 11112 are not connected to the sealing portion outer wall 11111 but are respectively connected to the other two of the three sealing portion ribbed plates 11112.

In the battery pack protective frame 11 according to the present disclosure, referring to FIG. 4 to FIG. 14B, the battery fixed portion 1112 has a battery fixed portion outer wall 11121 forming an external profile of the battery fixed portion 1112 and a battery fixed portion cavity S3 inside the battery fixed portion outer wall 11121.

In the battery pack protective frame 11 according to the present disclosure, referring to FIG. 5A, FIG. 10A, FIG. 12A and FIG. 13A, there is no any battery fixed portion ribbed plate 11122 in the battery fixed portion cavity S3.

In the battery pack protective frame 11 according to the present disclosure, referring to FIG. 6A, FIG. 7A, FIG. 8A, FIG. 9A, FIG. 11A and FIG. 14A, the battery fixed portion 1112 further has: at least one battery fixed portion ribbed plate 11122 positioned in the battery fixed portion cavity S3, supporting the battery fixed portion outer wall 11121 and dividing the battery fixed portion cavity S3 into a plurality of sub-cavities. The battery fixed portion ribbed plate 11122 can ensure the strength of the battery fixed portion 1112.

In the battery pack protective frame 11 according to the present disclosure, referring to FIG. 6A, FIG. 7A, FIG. 8A, FIG. 9A, FIG. 11A and FIG. 14A, each battery fixed portion ribbed plate 11122 is a vertical ribbed plate which is parallel to the up-down direction U, a horizontal ribbed plate which is parallel to the inner-outer direction I, or an oblique ribbed plate which is neither parallel to the up-down direction U nor parallel to the inner-outer direction I.

In the battery pack protective frame 11 according to the present disclosure, referring to FIG. 6A, FIG. 7A, FIG. 8A, FIG. 9A, FIG. 11A and FIG. 14A, two ends of each battery fixed portion ribbed plate 11122 are connected to the battery fixed portion outer wall 11121. Furthermore, referring to FIG. 7A, the battery fixed portion ribbed plate 11122 is provided as multiple in number and there are at least one pair of battery fixed portion ribbed plates 11122 to cross each other in the multiple battery fixed portion ribbed plates 11122.

In the battery pack protective frame 11 according to the present disclosure, referring to FIG. 5A to FIG. 14B, the sealing portion 1111 has a sealing portion outer wall 11111 forming an external profile of the sealing portion 1111 and a sealing portion cavity S2 inside the sealing portion outer wall 11111; the battery fixed portion 1112 has a battery fixed portion outer wall 11121 forming an external profile of the battery fixed portion 1112 and a battery fixed portion cavity S3 inside the battery fixed portion outer wall 11121, and an end of the battery fixed portion outer wall 11121 is connected to an inner end of the sealing portion outer wall 11111 in the inner-outer direction I. The protective portion 1113 has a protective portion outer wall 11131 forming an external profile of the protective portion 1113 and a protective portion cavity S1 inside the protective portion outer wall 11131, and an end of the protective portion outer wall 11131 is connected to an outer end of the sealing portion outer wall 11111 in the inner-outer direction I. Correspondingly, each frame component 111 further comprises a connecting wall 1114 connecting the other end of the battery fixed portion outer wall 11121 and the other end of the protective portion outer wall 11131, so that the sealing portion outer wall 11111, the battery fixed portion outer wall 11121, the protective portion outer wall 11131 and the connecting wall 1114 form a closed profile.

In the battery pack protective frame 11 according to the present disclosure, referring to FIG. 5A to FIG. 13B, the protective portion outer wall 11131, the battery fixed portion outer wall 11121 and the connecting wall 1114 form an avoiding recess R which is recessed upwardly in the up-down direction U. When the battery pack protective frame 11 acutely collides or is acutely crushed, the battery pack protective frame 11 can be bent in the avoiding recess R, thereby further absorbing energy and better protecting the battery assemblies 2.

In the battery pack protective frame 11 according to the present disclosure, referring to FIG. 5A, FIG. 6A, FIG. 8A, FIG. 10A, FIG. 11A, FIG. 12A, FIG. 13A and FIG. 14A, each frame component 111 further has at least one inter-portion ribbed plate 1115, an end of each inter-portion ribbed plate 1115 is connected to the connecting wall 1114, and the other end of the inter-portion ribbed plate 1115 is connected to one of the sealing portion outer wall 11111, the battery fixed portion outer wall 11121 and the protective portion outer wall 11131. In an embodiment, referring to FIG. 6A, FIG. 10A and FIG. 14A, the sealing portion 1111 further has at least one sealing portion ribbed plates 11112 positioned in the sealing portion cavity S2, supporting the sealing portion outer wall 11111 and crossing the inter-portion ribbed plate 1115. In another embodiment, referring to FIG. 5A, the protective portion 1113 further has at least one protective portion ribbed plate 11132 positioned in the protective portion cavity S1 and supporting the protective portion outer wall 11131; one inter-portion ribbed plate 1115 and corresponding one protective portion ribbed plate 11132 are located in a straight line and are connected via a joint location between the connecting wall 1114 and the protective portion outer wall 11131. When the battery pack protective frame 11 collides or is crushed, impact force on the corresponding one protective portion ribbed plate 11132 can be transmitted and dispersed along the inter-portion ribbed plate 1115, thereby improving the anti-collision ability and the anti-crushing ability of the battery pack protective frame 11.

In the battery pack protective frame 11 according to the present disclosure, referring to FIG. 7A, the sealing portion 1111 further has at least one sealing portion ribbed plate 11112 positioned in the sealing portion cavity S2 and supporting the sealing portion outer wall 11111; each frame component 111 further has at least one inter-portion ribbed plate 1115, an end of each inter-portion ribbed plate 1115 is connected to the connecting wall 1114 and the other end of each inter-portion ribbed plate 1115 is connected to corresponding one sealing portion ribbed plate 11112.

In the battery pack protective frame 11 according to the present disclosure, referring to FIG. 6A, FIG. 7A, FIG. 8A, FIG. 9A, FIG. 11A and FIG. 14A, the sealing portion 1111 further has at least one sealing portion ribbed plate 11112 positioned in the sealing portion cavity S2 and supporting the sealing portion outer wall 11111; the battery fixed portion 1112 further has at least one battery fixed portion ribbed plate 11122 positioned in the battery fixed portion cavity S3 and supporting the battery fixed portion outer wall 11121; the protective portion 1113 further has at least one protective portion ribbed plate 11132 positioned in the protective portion cavity S1 and supporting the protective portion outer wall 11131.

Secondly, a battery pack according to a second aspect of the present disclosure will be described.

Referring to FIG. 1 to FIG. 14B, a battery pack according to the present disclosure comprises a lower box body 1, a plurality of battery assemblies 2, a box cover 3, a gasket 4, a bottom plate 5 and a protective plate 6. The lower box body 1 comprises the battery pack protective frame 11 according to the first aspect of the present disclosure. The plurality of battery assemblies 2 are received in the battery pack protective frame 11 and each battery assembly 2 is securely connected to the corresponding battery fixed portion 1112 of the frame component 111. The box cover 3 is provided above the battery pack protective frame 11 and securely connected to the sealing portions 1111 of the plurality of frame components 111. The gasket 4 is interposed between the box cover 3 and the sealing portions 1111 of the plurality of frame components 111. The bottom plate 5 is provided under the battery pack protective frame 11 and securely connected to the battery fixed portions 1112 of the plurality of frame components 111. The protective plate 6 is provided under the bottom plate 5 and securely connected to the protective portions 1113 of the plurality of frame components 111.

In the battery pack according to the present disclosure, because the battery pack protective frame 11 is connected with the vehicle fixing member F directly, when the vehicle collides or is crushed, the protective portions 1113 of the battery pack protective frame 11 can absorb the energy generated in the colliding process or crushing process by generating deformation, thereby effectively protecting the battery assemblies 2 fixed to the battery fixed portion 1112, preventing the battery assemblies 2 from colliding or being crushed under the energy impact, avoiding the battery assemblies 2 firing or exploding. In addition, the protective portion 1113 is both a protecting structure and a connecting structure between the battery pack protective frame 11 and the vehicle fixing member F, therefore, compare to the independent protecting structure and the independent connecting structure of prior art, the protecting structure and the connecting structure of the battery pack of present disclosure are directly designed as an integral battery pack protective frame 11, which has high integration and improves whole structure performance of the vehicle.

In the battery pack according to the present disclosure, because each frame component 111 of the battery pack protective frame 11 may be made of aluminum alloy, and the aluminum alloy can reduce the weight of the battery pack protective frame 11, thereby improving energy density of the battery pack of the present disclosure.

In the battery pack according to the present disclosure, each battery assembly 2 comprises a battery module, voltage control system and current control system.

In the battery pack according to the present disclosure, the sealing portion 1111 may be provided with holes, so the sealing portion 1111 can be connected with the box cover 3 by bolts. In order to ensure a sealing area between the sealing portion 1111 and the box cover 3, a width of the sealing portion 1111 in inner-outer direction I is not less than 20 mm.

Figure 3:
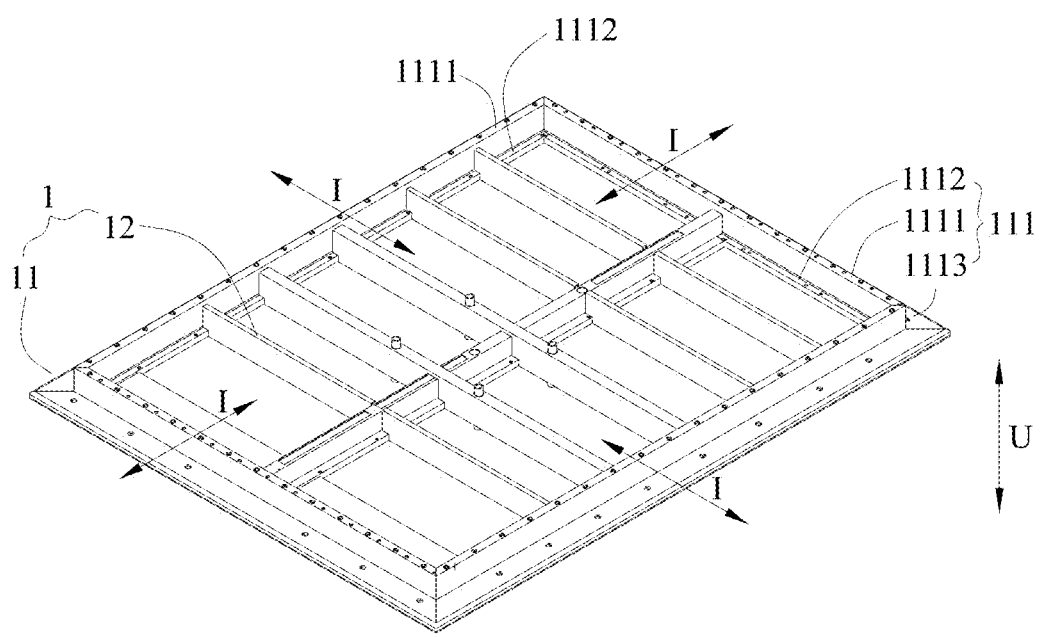
FIG. 3 is a schematic view of a lower box body of the battery pack according to the present disclosure.

In the battery pack according to the present disclosure, referring to FIG. 1 and FIG. 3, the lower box body 1 further comprises a plurality of reinforcing beams 12 provided inside the battery pack protective frame 11, and two ends of each reinforcing beam 12 are fixed to corresponding two frame components 111 respectively. The plurality of reinforcing beams 12 may be divided into horizontal reinforcing beams and vertical reinforcing beams to cross each other, thereby improving whole strength of the lower box body 1. Each reinforcing beam 12 may be welded to the sealing portion 1111 or the battery fixed portion 1112 of corresponding frame component 111.

Figure 4:
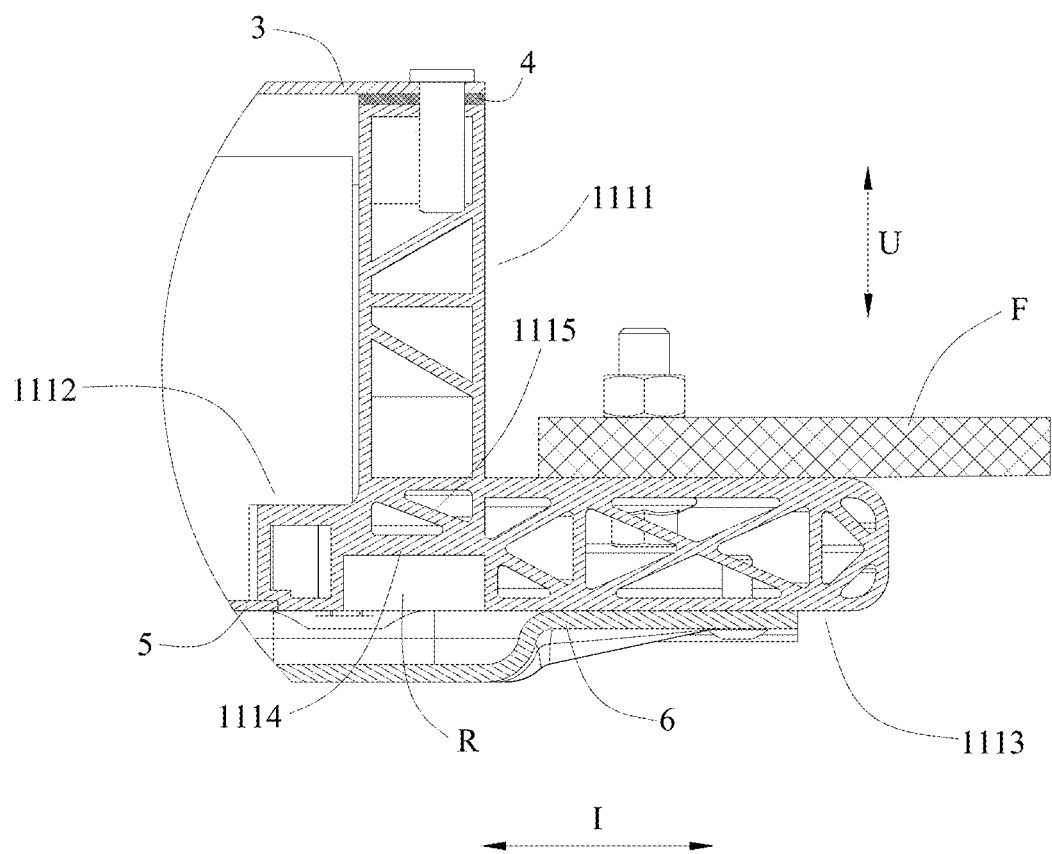
FIG. 4 is a schematic view illustrating a connection between a vehicle fixing member and the battery pack according to the present disclosure.

In the battery pack according to the present disclosure, referring to FIG. 4, the box cover 3 and the bottom plate 5 respectively seal the space surrounded by the battery pack protective frame 11 from two sides in the up-down direction U. The bottom plate 5 is only used for sealing and does not bear the weight of the battery pack.

In the battery pack according to the present disclosure, referring to FIG. 4, the battery fixed portion 1112 is provided with a notch for welding the bottom plate 5.

In the battery pack according to the present disclosure, the avoiding recess R formed in the battery pack protective frame 11 may be used to receive a functional component (such as liquid cooling pipe).

In the battery pack according to the present disclosure, the protective plate 6 can protect the battery pack in the working process of the vehicle, avoid gravel impacting, prevent the friction and the collision of the bottom of the vehicle.

What is claimed is:

1. A battery pack protective frame, comprising a plurality of frame components securely connected together, wherein each frame component comprises:
    a sealing portion extending in an up-down direction for sealing a plurality of battery assemblies to be mounted;
    a battery fixed portion protruding from a lower portion of the sealing portion toward an inner side in an inner-outer direction for fixing the plurality of battery assemblies to be mounted; and
    a protective portion protruding from the lower portion of the sealing portion toward an outer side in the inner-outer direction for connecting with a vehicle fixing member;
    wherein the sealing portion, the battery fixed portion and the protective portion of each frame component are integrally formed;
    wherein the protective portion has: a protective portion outer wall forming an external profile of the protective portion and a protective portion cavity inside the protective portion outer wall; and a plurality of protective portion ribbed plates positioned inside the protective portion cavity, supporting the protective portion outer wall and dividing the protective portion cavity into a plurality of sub-cavities;
    wherein two ends of each protective portion ribbed plate are connected to the protective portion outer wall; and
    wherein, in the plurality of protective portion ribbed plates, there are two protective portion ribbed plates which are provided at an outer end of the protective portion cavity in the inner-outer direction; in the two protective portion ribbed plates, an end of one protective portion ribbed plate and an end of the other one protective portion ribbed plate are connected together and are connected to an outer part of the protective portion outer wall in the inner-outer direction, and the other end of the one protective portion ribbed plate and the other end of the other one protective portion ribbed plate are respectively connected to two opposite parts of the protective portion outer wall in the up-down direction.

2. The battery pack protective frame according to claim 1, wherein in the plurality of protective portion ribbed plates, there is another protective portion ribbed plate which is further provided in the protective portion cavity of the protective portion and connects the other end of the one protective portion ribbed plate and the other end of the other one protective portion ribbed plate.

3. The battery pack protective frame according to claim 1, wherein
    in the plurality of protective portion ribbed plates, there are two protective portion ribbed plates which are provided at an inner end of the protective portion cavity in the inner-outer direction;
    in the two protective portion ribbed plates, an end of one protective portion ribbed plate and an end of the other one protective portion ribbed plate are connected together and are connected to an inner part of the protective portion outer wall in the inner-outer direction, and the other end of the one protective portion ribbed plate and the other end of the other one protective portion ribbed plate are respectively connected to two opposite parts of the protective portion outer wall in the up-down direction.

4. The battery pack protective frame according to claim 3, wherein in the plurality of protective portion ribbed plates, there is another protective portion ribbed plate which is further provided in the protective portion cavity of the protective portion and connects the other end of the one protective portion ribbed plate and the other end of the other one protective portion ribbed plate.

5. The battery pack protective frame according to claim 1, wherein
    the sealing portion has a sealing portion outer wall forming an external profile of the sealing portion and a sealing portion cavity inside the sealing portion outer wall;
    the battery fixed portion has a battery fixed portion outer wall forming an external profile of the battery fixed portion and a battery fixed portion cavity inside the battery fixed portion outer wall, and an end of the battery fixed portion outer wall is connected to an inner end of the sealing portion outer wall in the inner-outer direction;
    the protective portion has a protective portion outer wall forming an external profile of the protective portion and a protective portion cavity inside the protective portion outer wall, and an end of the protective portion outer wall is connected to an outer end of the sealing portion outer wall in the inner-outer direction;
    each frame component further comprises a connecting wall connecting the other end of the battery fixed portion outer wall and the other end of the protective portion outer wall, so that the sealing portion outer wall, the battery fixed portion outer wall, the protective portion outer wall and the connecting wall form a closed profile;
    the protective portion outer wall, the battery fixed portion outer wall and the connecting wall form an avoiding recess which is recessed upwardly in the up-down direction.

6. The battery pack protective frame according to claim 5, wherein
    each frame component further has at least one inter-portion ribbed plate, an end of each inter-portion ribbed plate is connected to the connecting wall, and the other end of the corresponding inter-portion ribbed plate is connected to one of the sealing portion outer wall, the battery fixed portion outer wall and the protective portion outer wall;

the protective portion further has at least one protective portion ribbed plate positioned in the protective portion cavity and supporting the protective portion outer wall;

one inter-portion ribbed plate and corresponding one protective portion ribbed plate are located in a straight line and are connected via a joint location between the connecting wall and the protective portion outer wall.

7. The battery pack protective frame according to claim 5, wherein the sealing portion further has at least a sealing portion ribbed plate positioned in the sealing portion cavity and supporting the sealing portion outer wall;

the battery fixed portion further has a plurality of battery fixed portion cavity ribbed plates positioned in the battery fixed portion cavity and supporting the battery fixed portion outer wall;

the protective portion further has at least one protective portion ribbed plate positioned in the protective portion cavity and supporting the protective portion outer wall.

8. A battery pack, wherein the battery pack comprises:

a lower box body comprising a battery pack protective frame, the battery pack protective frame comprises a plurality of frame components securely connected together, each frame component comprises a sealing portion extending in an up-down direction for sealing a plurality of battery assemblies to be mounted, a battery fixed portion protruding from a lower portion of the sealing portion toward an inner side in an inner-outer direction for fixing the plurality of battery assemblies to be mounted, and a protective portion protruding from the lower portion of the sealing portion toward an outer side in the inner-outer direction for connecting with a vehicle fixing member;

a plurality of battery assemblies received in the battery pack protective frame and each battery assembly is securely connected to the corresponding battery fixed portion of the frame component;

a box cover provided above the battery pack protective frame and securely connected to the sealing portions of the plurality of frame component;

a gasket interposed between the box cover and the sealing portions of the plurality of frame components;

a bottom plate provided under the battery pack protective frame and securely connected to the battery fixed portions of the plurality of frame components; and a protective plate provided under the bottom plate and securely connected to the protective portions of the plurality of frame components;

wherein the sealing portion, the battery fixed portion and the protective portion of each frame component are integrally formed;

wherein the protective portion has: a protective portion outer wall forming an external profile of the protective portion and a protective portion cavity inside the protective portion outer wall; and a plurality of protective portion ribbed plates positioned inside the protective portion cavity, supporting the protective portion outer wall and dividing the protective portion cavity into a plurality of sub-cavities;

wherein two ends of each protective portion ribbed plate are connected to the protective portion outer wall; and wherein, in the plurality of protective portion ribbed plates, there are two protective portion ribbed plates which are provided at an outer end of the protective portion cavity in the inner-outer direction; in the two protective portion ribbed plates, an end of one protective portion ribbed plate and an end of the other one protective portion ribbed plate are connected together and are connected to an outer part of the protective portion outer wall in the inner-outer direction, and the other end of the one protective portion ribbed plate and the other end of the other one protective portion ribbed plate are respectively connected to two opposite parts of the protective portion outer wall in the up-down direction.

9. The battery pack according to claim 8, wherein in the plurality of protective portion ribbed plates, there is another protective portion ribbed plate which is further provided in the protective portion cavity of the protective portion and connects the other end of the one protective portion ribbed plate and the other end of the other one protective portion ribbed plate.

10. The battery pack according to claim 8, wherein in the plurality of protective portion ribbed plates, there are two protective portion ribbed plates which are provided at an inner end of the protective portion cavity in the inner-outer direction;

in the two protective portion ribbed plates, an end of one protective portion ribbed plate and an end of the other one protective portion ribbed plate are connected together and are connected to an inner part of the protective portion outer wall in the inner-outer direction, and the other end of the one protective portion ribbed plate and the other end of the other one protective portion ribbed plate are respectively connected to two opposite parts of the protective portion outer wall in the up-down direction.

11. The battery pack according to claim 10, wherein in the plurality of protective portion ribbed plates, there is another protective portion ribbed plate which is further provided in the protective portion cavity of the protective portion and connects the other end of the one protective portion ribbed plate and the other end of the other one protective portion ribbed plate.

12. The battery pack according to claim 8, wherein the sealing portion has a sealing portion outer wall forming an external profile of the sealing portion and a sealing portion cavity inside the sealing portion outer wall;

the battery fixed portion has a battery fixed portion outer wall forming an external profile of the battery fixed portion and a battery fixed portion cavity inside the battery fixed portion outer wall, and an end of the battery fixed portion outer wall is connected to an inner end of the sealing portion outer wall in the inner-outer direction;

the protective portion has a protective portion outer wall forming an external profile of the protective portion and a protective portion cavity inside the protective portion outer wall, and an end of the protective portion outer wall is connected to an outer end of the sealing portion outer wall in the inner-outer direction;

each frame component further comprises a connecting wall connecting the other end of the battery fixed portion outer wall and the other end of the protective portion outer wall, so that the sealing portion outer wall, the battery fixed portion outer wall, the protective portion outer wall and the connecting wall form a closed profile;

the protective portion outer wall, the battery fixed portion outer wall and the connecting wall form an avoiding recess which is recessed upwardly in the up-down direction.

13. The battery pack according to claim 12, wherein each frame component further has at least one inter-portion ribbed plate, an end of each inter-portion ribbed plate is connected to the connecting wall, and the other end of the corresponding inter-portion ribbed plate is connected to one of the sealing portion outer wall, the battery fixed portion outer wall and the protective portion outer wall;

the protective portion further has at least one protective portion ribbed plate positioned in the protective portion cavity and supporting the protective portion outer wall;

one inter-portion ribbed plate and corresponding one protective portion ribbed plate are located in a straight line and are connected via a joint location between the connecting wall and the protective portion outer wall.

14. The battery pack according to claim 12, wherein the sealing portion further has at least a sealing portion ribbed plate positioned in the sealing portion cavity and supporting the sealing portion outer wall;

the battery fixed portion further has a plurality of battery fixed portion cavity ribbed plates positioned in the battery fixed portion cavity and supporting the battery fixed portion outer wall;

the protective portion further has at least one protective portion ribbed plate positioned in the protective portion cavity and supporting the protective portion outer wall.

* * * * *